(12) United States Patent
Potter et al.

(10) Patent No.: US 7,584,093 B2
(45) Date of Patent: Sep. 1, 2009

(54) METHOD AND SYSTEM FOR GENERATING SPELLING SUGGESTIONS

(75) Inventors: Douglas W. Potter, Seattle, WA (US); Edward C. Hart, Jr., Redmond, WA (US); Hisakazu Igarashi, Bellevue, WA (US); Patricia M. Schmid, Redmond, WA (US); William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 11/113,612

(22) Filed: Apr. 25, 2005

(65) Prior Publication Data

US 2006/0241944 A1   Oct. 26, 2006

(51) Int. Cl.
*G06F 17/27* (2006.01)
(52) U.S. Cl. .............. 704/9; 704/1; 704/4; 704/10
(58) Field of Classification Search ............ 704/9, 704/4, 10, 1
See application file for complete search history.

(56) References Cited

U.S. PATENT DOCUMENTS

| 5,604,897 | A | 2/1997 | Travis | 395/795 |
|---|---|---|---|---|
| 5,649,222 | A | 7/1997 | Mogilevsky | 395/795 |
| 5,765,180 | A | 6/1998 | Travis | 707/533 |
| 5,787,451 | A | 7/1998 | Mogilevsky | 707/533 |
| 6,085,206 | A | 7/2000 | Domini et al. | 707/533 |
| 6,131,102 | A | 10/2000 | Potter | 707/533 |
| 6,154,843 | A | 11/2000 | Hart, Jr. et al. | 713/201 |
| 6,298,321 | B1 | 10/2001 | Karlov et al. | 704/10 |
| 6,304,878 | B1 | 10/2001 | Karlov et al. | 707/102 |
| 6,374,210 | B1* | 4/2002 | Chu | 704/9 |
| 6,401,060 | B1 | 6/2002 | Critchlow et al. | 704/1 |
| 6,424,983 | B1* | 7/2002 | Schabes et al. | 715/257 |
| 6,601,059 | B1 | 7/2003 | Fries | 707/3 |
| 6,675,169 | B1 | 1/2004 | Bennett et al. | 707/101 |
| 6,694,296 | B1 | 2/2004 | Alleva et al. | 704/255 |
| 6,889,361 | B1* | 5/2005 | Bates et al. | 715/257 |
| 2002/0165873 | A1* | 11/2002 | Kwok et al. | 707/500 |
| 2004/0111475 | A1* | 6/2004 | Schultz | 709/206 |
| 2005/0080772 | A1* | 4/2005 | Bem | 707/3 |

* cited by examiner

*Primary Examiner*—Qi Han
(74) *Attorney, Agent, or Firm*—Westman, Champlin & Kelly, P.A.

(57) ABSTRACT

A computer implemented method of suggesting replacement words for words of a string. In the method, an input string of input words is received. The input words are then matched to subject words of a candidate table. Next, candidate replacement words and scores from the candidate table corresponding to the matched subject words are extracted. Each score is indicative of a probability that the input word should be replaced with the corresponding candidate replacement word. Finally, replacement of the input words with their corresponding candidate replacement words is selectively suggested based on the scores for the replacement words. Another aspect of the present invention is directed to a spell checking system that is configured to implement the method.

21 Claims, 4 Drawing Sheets

METHOD AND SYSTEM FOR GENERATING SPELLING SUGGESTIONS

FIELD OF THE INVENTION

The present invention generally relates to spell checking methods and systems and, more particularly, to spell checking methods and systems that are configured to suggest replacement words for those of an input string that are based on the words in the input string.

BACKGROUND OF THE INVENTION

Text entries, such as those in documents generated using a word processing application, can contain many different types of errors including spelling errors. Spelling errors that result in invalid words can generally be handled by a lexicon-based spell checker. Such misspellings may occur due to a typo or an ignorance of the spelling of the word.

Lexicon-based spell checkers compare the words in the text entry to a lexicon of words and identify the words in the text entry that are not found in the lexicon. One or more replacement words are often suggested for the misspelled word. For example, in the text entry "fly frm Boston", the spell checker would identify "frm" as being misspelled.

Other types of misspellings result in valid words that are generally not detectable using traditional spell checking applications. For instance, an unintended valid word may be entered by a user of the word processing application as a result of a typo or an ignorance of the spelling of the intended word. For example, in a text entry "fly form Boston", the word "form" is a valid word that would not be flagged by conventional spell checking applications, even though the word is a misspelling of the intended word "from". The correction of these types of misspellings generally requires an analysis of the context in which the word is used.

Traditional spell checking applications generally base the suggested replacement words for identified invalid words on an edit distance. The edit distance represents the change that is required to form a valid alternative word. The word in the lexicon having the shortest edit distance from the typed invalid word is the first replacement word that is suggested to the user. For example, in the phrase "fly frm Boston" most spell checking applications would suggest "form" as the replacement word before the correct word "from" is suggested, because the context of the word is not taken into account when making the suggestion. In order to suggest the most appropriate replacement word for the misspelling, an analysis of the context in which the misspelling is found must be made.

Accordingly, a need exists for improved spell checking methods and systems that are capable of analyzing the context in which the words are used to provide better suggestions for misspelled words and improved detection of valid words that are used improperly.

Embodiments of the present invention provide solutions to these and other problems, and offer other advantages over the prior art.

SUMMARY OF THE INVENTION

The present invention generally relates to spell checking methods and systems that utilize a candidate table that includes subject word and candidate replacement word pairs and a candidate score for each pair, on which word replacement suggestions are based.

One aspect of the present invention relates to a computer implemented method of suggesting replacement words for words of a string. In the method, an input string of input words is received. The input words are then matched to subject words of a candidate table. Next, candidate replacement words and candidate scores from the candidate table corresponding to the matched subject words are extracted. Each candidate score is indicative of a probability that the input word should be replaced with the corresponding candidate replacement word. Finally, replacement of the input words with their corresponding candidate replacement words is selectively suggested based on the candidate scores for the replacement words.

Another aspect of the present invention is directed to a spell checking system for suggesting replacement words for input words of an input string. The system includes a candidate generator and a contextual spelling engine. The candidate generator includes an output of a candidate replacement word and a corresponding candidate score for each of the input words that match a subject word of a candidate table. Each candidate score is indicative of a probability that the input word should be replaced with the corresponding candidate replacement word. The contextual spelling engine includes a selective output of candidate replacement words for the input words based on the corresponding candidate scores.

Yet another aspect of the present invention is directed to a method of forming a candidate table for use in a spell checking system to suggest replacement words for input words of an input string. In the method, a lexicon of words is provided. Next, subject words in the lexicon are compared to the other words in the lexicon. Candidate replacement words are then identified for the subject words based on the comparison. A candidate table is then formed that includes pairs of the identified subject words and their corresponding candidate replacement words. Finally, the candidate table is stored on a computer readable medium.

Other features and benefits that characterize embodiments of the present invention will be apparent upon reading the following detailed description and review of the associated drawings.

DETAILED DESCRIPTION OF ILLUSTRATIVE EMBODIMENTS

The present invention generally relates to a spell checking method and system for providing accurate replacement word suggestions for input words of an input string that are invalid. Additionally, the spell checking method and system of the present invention can provide replacement word suggestions for valid input words of an input string that are improperly used. Embodiments of the present invention base the replacement word suggestions on the context in which the input words are used.

Before describing the present invention in detail, a discussion of exemplary computing environments, in which the present invention can be used, will be provided.

Exemplary Computing Environment

Figure 1:
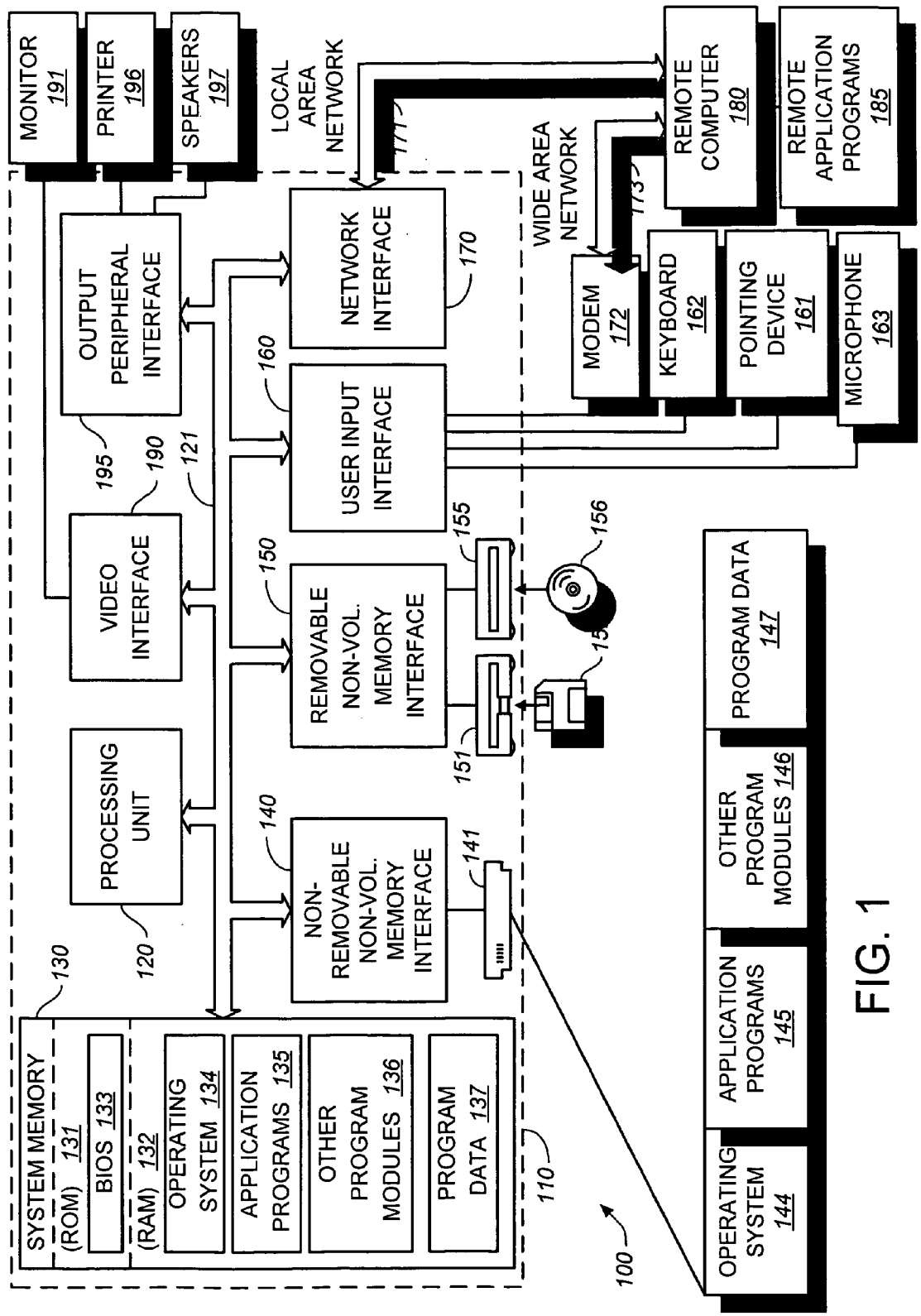
FIG. 1 is a block diagram of a computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Spell Checking Method and System

As mentioned above, the present invention generally relates to a spell checking method and system for providing accurate replacement word suggestions for input words of an input string that are invalid. Additionally, the spell checking method and system of the present invention can provide replacement word suggestions for valid input words of an input string that are improperly used. The replacement word suggestions provided by the present invention are generally based on the context in which the input words are used.

Additionally, the present invention provides a data-driven approach to spell checking. As a result, embodiments of the spell checking method and system do not require the same kind of theoretical linguistic expertise as parse- or rule-based grammar checkers. The implementation is also much simpler than that of rule-based systems, with lower maintenance and security costs. Additionally, the mechanism for generating suggestions is generally language-independent and can easily scale to multiple languages.

Figure 2:
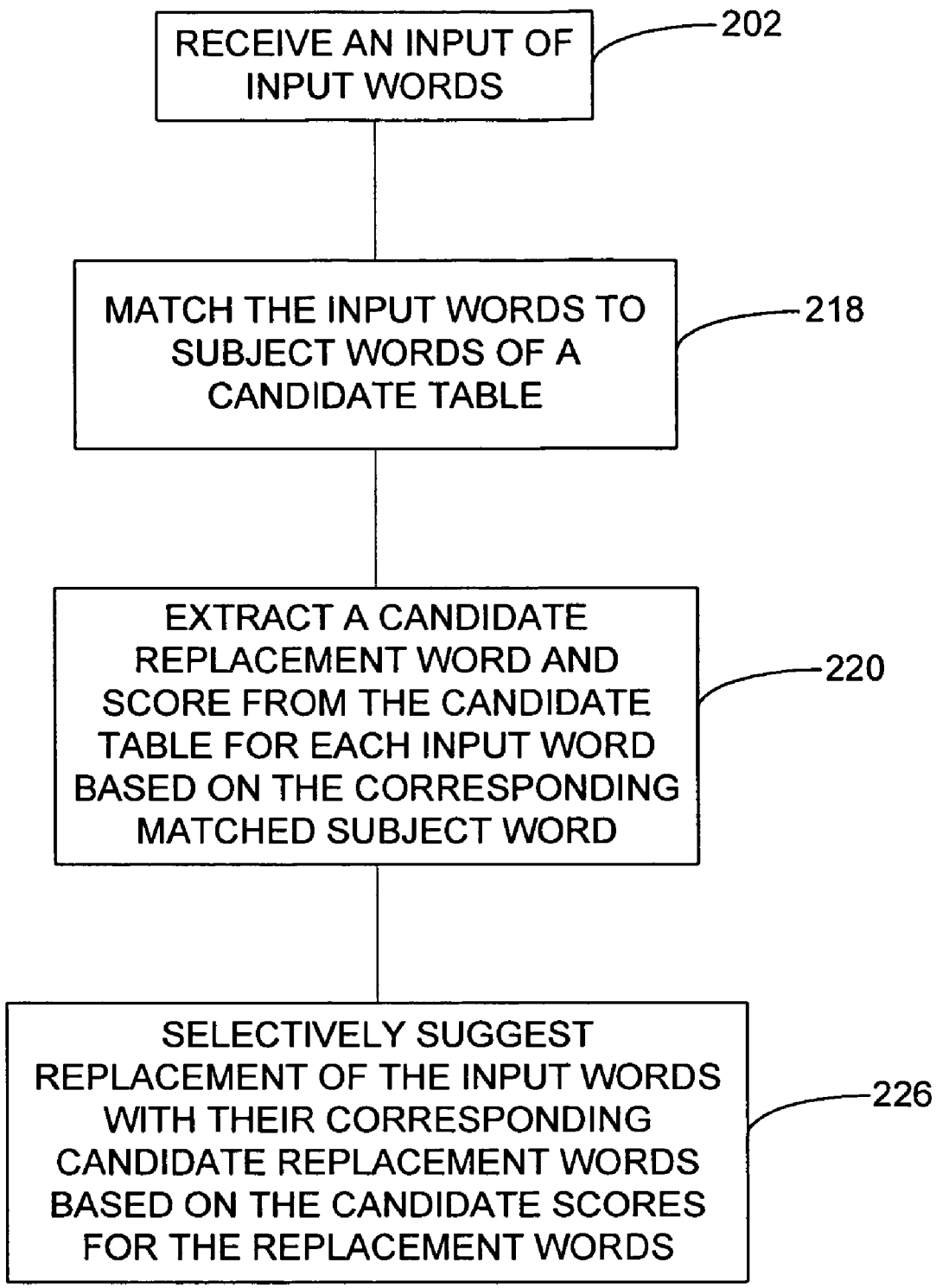
FIG. 2 is a flowchart illustrating a method of suggesting replacement words for words of a string, in accordance with embodiments of the invention.

Embodiments of the present invention will be discussed with reference to FIGS. 2 and 3. FIG. 2 is a flowchart illustrating a method of suggesting replacement words for words of a string in accordance with embodiments of the invention.

Figure 3:
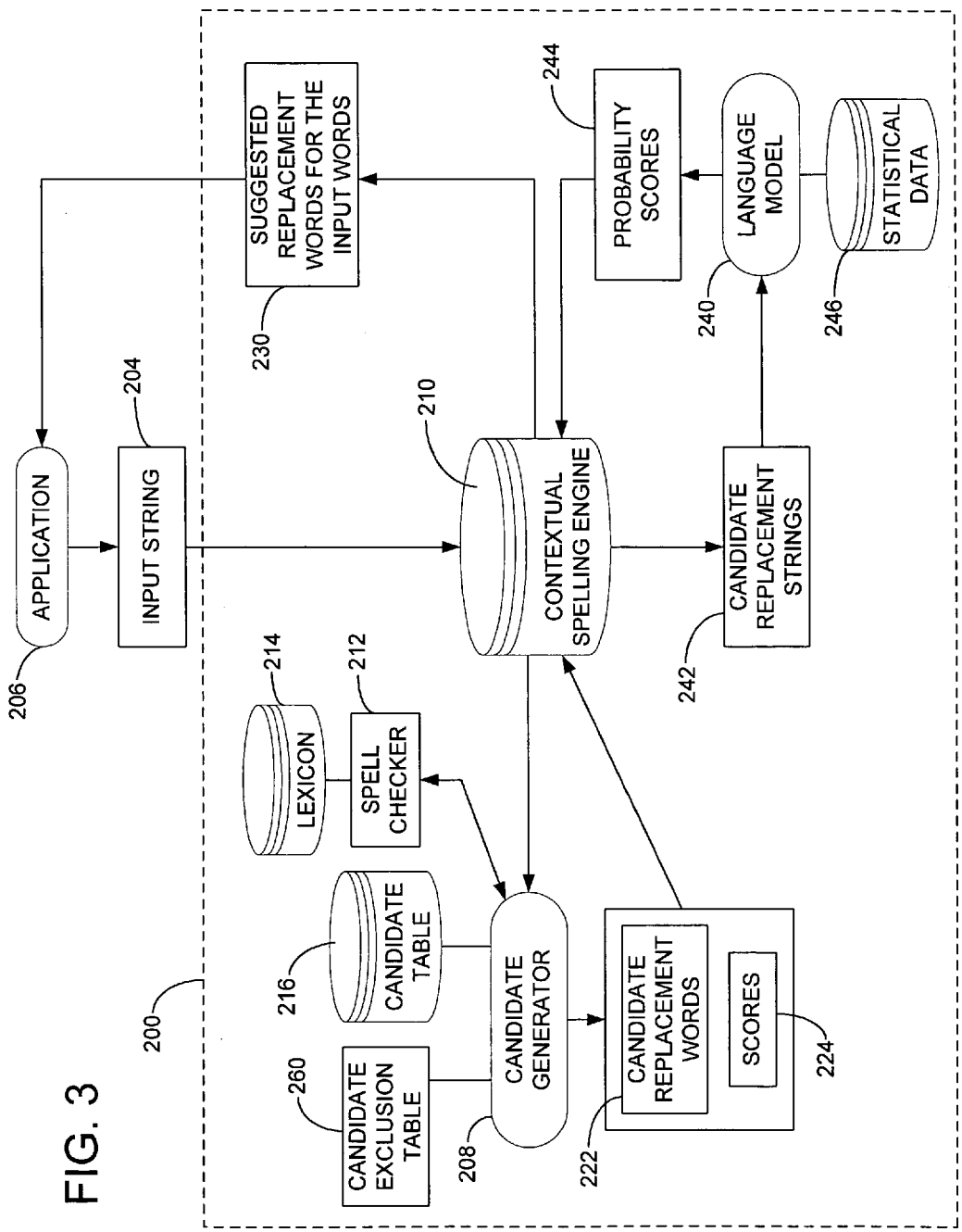
FIG. 3 is a block diagram of a spell checking system in accordance with embodiments of the invention.

FIG. 3 is a block diagram of a spell checking system 200, in accordance with embodiments of the invention, that is configured to implement the method.

At step 202 of the method, an input string 204 of input words is received by the spell checking system 200. The input string 204 can be initially entered by a user of the word processing application 206 via a keyboard, a microphone (i.e., dictated), or other conventional method. Alternatively, the input string 204 can be retrieved from a pre-existing document, a web page, or from another source.

Preferably, the application 206 provides the input string 204 to the system 200 in complete sentences. Additionally, the input string 204 can be provided to the spell checking system 200 in a tokenized form or other recognizable format, or otherwise be transformed into said format by the system 200.

The input string is provided to a candidate generator 208 from a contextual spelling engine 210 of the system 200. Preferably, the input string 204 contains only valid (i.e., correctly spelled) words.

In accordance with one embodiment of the method, misspelled input words of the input string 204 are corrected using a lexicon-based spell checker 212. The spell checker 212 compares each input word of the input string 204 to the words of a lexicon 214. Suggested replacements for input words that are not contained in the lexicon 214 are generated by the spell checker 212 in accordance with conventional methods. The suggested replacements generated by the spell checker 212 can be presented to the user for selection of a replacement for misspelled words identified by the spell checker 212 and the input string is modified accordingly. Alternatively, the suggested corrections generated by the spell checker 212 for misspelled input words are provided to the candidate generator 208, which forms an input string containing only valid words. The input string containing only valid words is then analyzed by the candidate generator 208.

The purpose of the candidate generator 208 is to identify candidate replacement words that are similar, or otherwise related, to the input words of the input string 204. The candidate replacement words may later be provided to the application 206 as suggested replacement words for the input words. The candidate replacement word and input word pairs are contained in a candidate table 216.

Table 1 is an example of a portion of a candidate table 216 in accordance with embodiments of the invention. The candidate table 216 includes subject words that are each associated to a candidate replacement word, and a candidate score that is indicative of a probability that the subject word should be replaced with the candidate replacement word.

TABLE 1

Exemplary Candidate Table

| Subject Word | Candidate Replacement Word | Candidate Score | Edit |
|---|---|---|---|
| aback | alack | 0.543 | b:l |
| aback | back | 0.023 | a: |
| abalones | abalone's | 0.870 | A |
| abandoned | abandoner | 0.765 | d:r |
| break | brake | 0.689 | H |

One embodiment of the candidate Table 216 includes an edit entry for each subject and candidate replacement word pair that describes the transformation that must be performed on the subject word to form the candidate replacement word. For example, to transform "aback" to "alack" the "b" of "aback" must be changed to an "l", which is denoted as "b:l". Similarly, the deletion of the first "a" in "aback" to form the candidate replacement word "back" can be denoted as "a:". The addition of the "'" to abalone's can be denoted simply as "A". Homonym candidate replacement words, such as "brake" for the subject word "break", are denoted as "H". Other methods for identifying various edits that must be performed to transform the subject word into the corresponding candidate replacement word can also be used.

The edit entry in the candidate table can be used by the contextual spelling engine 210 to modify the score for the candidate replacement word during an analysis of the input string. Edit entries can be grouped into classes and assigned different values that reflect such things as the frequency of a class of edit types. The higher the value, the greater the effect of the edit type on a candidate replacement word's score. These class or edit type scores can be in addition to or included in the candidate score. For example, an edit of deleting a beginning character of the subject word to form the candidate replacement word could result in an increase to the score for the candidate replacement word.

In accordance with one embodiment of the invention, the candidate table 216 is stored on a computer readable medium as a binary file, which is loaded into memory of the computing environment for quick access by the spell checking system 200. In accordance with one embodiment of the invention, the candidate table 216 is stored as a hash table in the binary file.

In accordance with another embodiment of the candidate table 216, lexicon identifiers are used to identify the subject and candidate replacement words. The lexicon identifiers provide a link to the corresponding words in a lexicon, such as lexicon 214 shown in FIG. 3. This embodiment of the invention operates to reduce the amount of memory that is required to store the large candidate table 216.

At step 218 of the method, the candidate generator 208 matches the input words of the input string 204 to subject words of the candidate table 216. Candidate replacement words 222 and corresponding candidate scores 224 are then extracted from the candidate table 216 for each input word of the input string 204 based on the corresponding matched subject word, at step 220. Since there may be many candidate replacement words associated with the same subject or input word, the candidate generator 208 may produce more than one candidate replacement word and score pair for each matched input word. The candidate replacement word 222 and score 224 pairs are output to the contextual spelling engine 210 for further processing.

The candidate score 224 in the candidate table 216 is generally indicative of a probability that the input word should be replaced with the corresponding candidate replacement word. Additionally, the candidate score 224 can reflect the amount of error between the subject word and the corresponding candidate replacement word 222.

In accordance with one embodiment of the invention, the candidate score 224 is based on one or more factors, each of which are preferably multiplied together to form the candidate score for the subject word and candidate replacement word pair in the candidate table 216. Such factors include an edit or typing distance between the subject word and the candidate replacement word, heuristics, a phonetic difference between the subject word and the candidate replacement word, and other factors that could relate to a likelihood that the candidate replacement word should replace the subject word.

Candidate scores 224 based on an edit type and heuristics will vary depending on the difference between the subject word and the candidate replacement word. For example, the likelihood that a singular subject word should be transformed into a plural candidate replacement word may be very rare. As a result, such candidate replacement words should be given a low candidate score. On the other hand, when the transformation from the subject word to the candidate replacement word involves a modification to the first character only, which relates to a more commonly encountered spelling error, such subject and candidate replacement word pairs receive a high candidate score.

Also related to the edit distance are scores that are based on the separation of the subject word into two words by adding a space to the subject word. Such edits are generally given a high candidate score due to their relatively high frequency.

When the candidate replacement word is a homophone or a near-homophone of the subject word, the word pair is given a higher score than when the candidate replacement word does not substantially phonetically resemble the subject word.

At step 226 of the method, the contextual spelling engine 210 selectively produces an output 230 of the candidate replacement words 222 for the input words of the input string 204, based on the corresponding scores 224 of the candidate replacement words 222. In accordance with one embodiment of the invention, the system 200 includes a language model 240 that receives candidate replacement strings 242 from the contextual spelling engine 210. The candidate replacement strings 242 are modified input strings 204, each of which include a candidate replacement word 222 in place of the corresponding input word.

The language model 240 operates to output probability scores 244 for each of the candidate replacement strings 242. The probability scores 244 generally provide a measure of a likelihood of seeing the particular candidate replacement string 242 based on statistical data 246 (i.e., word occurrence frequency data relative to other words) for a large log of sentences. In general, it is presumed that the more likely it is to see a particular string of words, the more likely the words contained in the string are used in a correct manner. Thus, the probability score 244 for each candidate replacement string 242 reflects the correctness of the combination of the input words with the candidate replacement word in that string.

The probability score 244 (denoted as P(context)) for a given string of words (i.e., $w_1$, $w_2$, $w_3$, ... $w_N$) can be calculated in accordance with Equation 1 using the statistical data 246. In general, the probability of the string is equal to the probability of each word in the string given the others. Thus, the probability of the string is equal to the probability of the first word ($P(w_1)$) multiplied by the probability of the second word given the first word ($P(w_2|w_1)$), multiplied by the probability of the third word given the first and second words ($P(w_3|w_2, w_1)$), and so on.

$$P(\text{context})=P(w_1)*P(w_2|w_1)*P(w_3|w_2,w_1)* \ldots *P(w_N|w_{N-1},w_{N-2}\ldots w_2,w_1) \quad \text{Eq. 1}$$

In accordance with one embodiment of the invention, a trigram approximation of Equation 1 is used, which is provided in Equation 2. For each word of the string, the trigram approximation uses the two preceding words (if they exist), rather than all N words of the string.

$$P(\text{context}) \sim P(w_1)*P(w_2|w_1)*P(w_3|w_2,w_1)* \ldots *P(w_N|w_{N-1},w_{N-2}) \quad \text{Eq. 2}$$

In accordance with one embodiment of the invention, the contextual spelling engine 210 selects the suggested candidate replacement words or strings 230 to output to the application 206, based on a final score for each candidate replacement string. The final scores (denoted as P(candidate|input word, context)) are each calculated in accordance with Equation 3 by multiplying the probability score for the candidate replacement string (denoted as P(context, candidate) by the candidate score 224 corresponding to the candidate replacement word 222 (candidate) that replaced the input word to form the candidate replacement string 242.

Let's say, for example, that candidate replacement words 222 of "too", "tot", and "two" are generated along with their corresponding scores 224 by the candidate generator 208 for the input word "to" of the input string 204 of "I see you to". The corresponding candidate replacement strings 242 then become "I see you too", "I see you tot", and "I see you two". The contextual spelling engine 210 then makes several calls to the language model 240, which calculates the probability scores for each of the candidate replacement strings 242.

The final scores for the candidate replacement strings 242 are then calculated by the contextual spelling engine 210 by multiplying their probability score 244 by their corresponding candidate score 224. Thus the final score for the candidate replacement string 242 "I see you too" is equal to the probability of the string "I see you too" multiplied by the score 224 corresponding to the candidate replacement word "too" for the input word "to" obtained from the candidate table 216.

In accordance with one embodiment of the invention, the candidate word 222 of the candidate replacement string having the highest final score is suggested to the application 206 by the contextual spelling engine 210 as the output 230. Alternatively, the contextual spelling engine 210 can suggest only the candidate replacement word 222 corresponding to the candidate replacement string 242 having the highest final score, provided that it exceeds a threshold. In accordance with another embodiment of the invention, multiple candidate replacement words 222 having final scores that exceed a threshold are suggested by the contextual spelling engine 210 to the application 206 as the output 230.

The threshold can be predetermined or dynamically calculated as a function of the probability of the subject words and the candidate words. In one embodiment, the threshold is determined dynamically from Threshold=α P(subject words)+β P(candidate words)+γ|P(input words) −P(candidate words).

Candidate Table Generation

Figure 4:
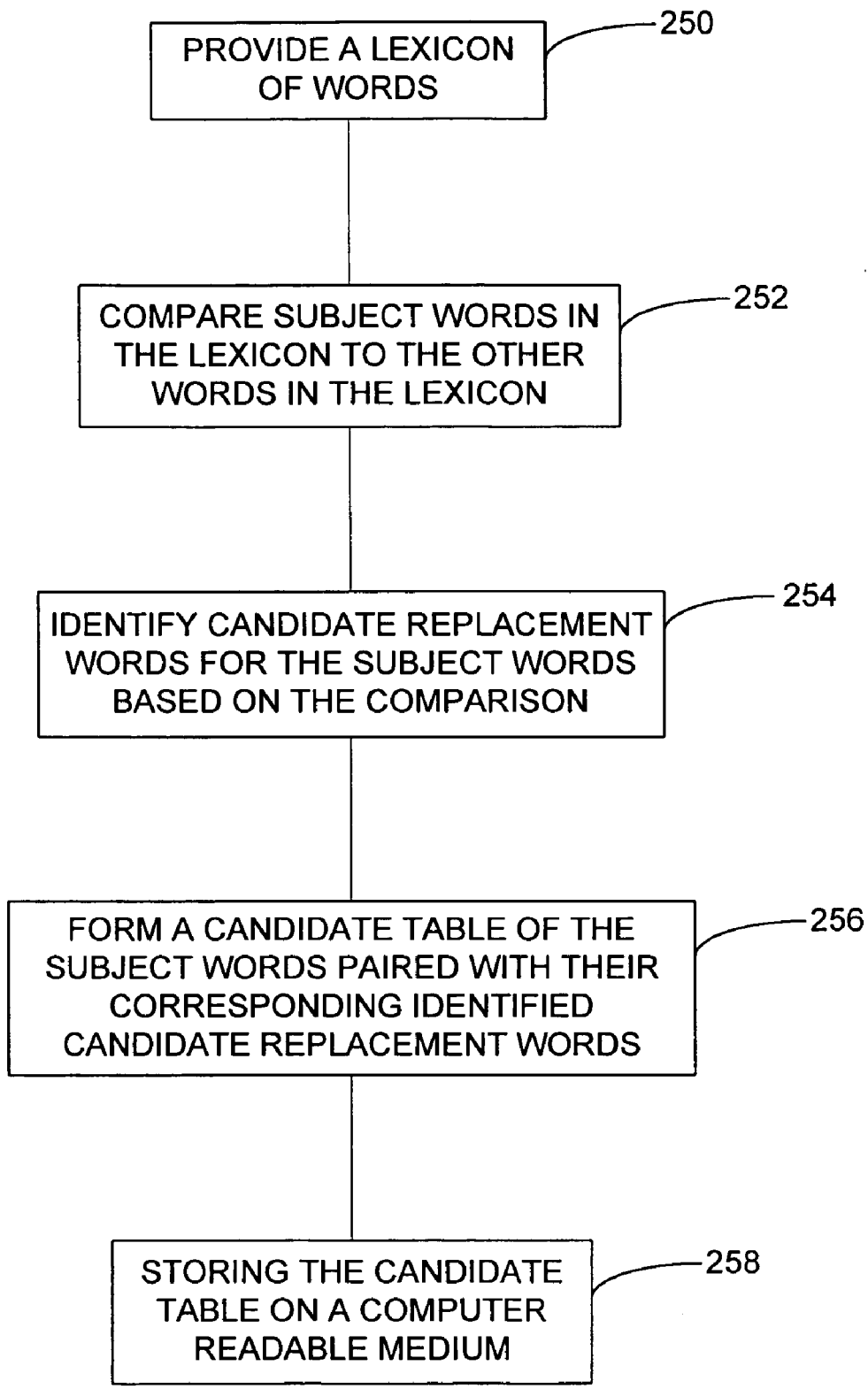
FIG. 4 is a flowchart illustrating a method of generating a candidate table for use by a spell checking system to suggest replacement words for input words of an input string, in accordance with embodiments of the invention.

FIG. 4 is a flowchart illustrating a method of generating the candidate table 216 for use by the spell checking system 200, in accordance with embodiments of the invention. At step 250 of the method, a lexicon of words is provided. Preferably the lexicon is very large (e.g., over 100,000 words). Next, at step 252, subject words in the lexicon are compared to the other words in the lexicon. Preferably, each word of the lexicon, or at least the most frequently used words of the lexicon, each become subject words that are compared to the other words in the lexicon. At step 254, candidate replacement words are identified for the subject words based on the comparison in step 252.

In accordance with one embodiment of the invention, the comparison of the subject words to the other words in the lexicon (step 252) involves calculating an edit or typing distance between each of the words of the lexicon to the subject word and comparing the edit distances to a threshold edit distance. The candidate replacement words having an edit distance that meets the threshold edit distance are identified as candidate replacement words for the subject words. It should be understood that the "meeting" of the threshold is intended to be satisfied by reaching the threshold, exceeding the threshold, or falling below the threshold, depending upon how the edit distances are calculated.

In accordance with another embodiment of the comparing step 252, a meaning of each of words of the lexicon is compared to the subject words. The identifying step 254 then includes identifying the words of the lexicon whose meaning is similar to that of the subject word, as candidate replacement words. For example, synonyms of the subject words would be identified as candidate replacement words. In accordance with one embodiment of the invention, the subject words of the lexicon are checked against thesaurus data, from which candidate replacement words having a similar meaning are identified as candidate replacement words in step 254 of the method.

In accordance with another embodiment of the comparing step 252, phonetic representations of the words in the lexicon are compared to the subject words of the lexicon. The phonetic representations of the words of the lexicon are preferably generated automatically through a submission of the words to a conventional text-to-speech engine. The words of the lexicon having phonetic representations that match the phonetic representation of the subject word are identified as candidate replacement words for the subject word in the identifying step 254. Examples of these pairs include "bear" and "bare", and "which" and "witch". Thus, homophones of the subject word are identified as candidate replacement words. In accordance with another embodiment of the invention, words of the lexicon that are near-homophones (i.e., those that meet a threshold) are also identified as candidate replacement words.

Another embodiment of the invention includes an analysis of bigrams (i.e., word pairs) found in a large log of sentences. The analysis involves determining whether shifting or deleting the space located between the first and second words of the bigram would result in the generation of at least one valid word. One embodiment of the comparing step 252 includes comparing the subject words to the valid words that are generated from the space-shifting analysis. Preferably, only the valid words that are formed by shifting the space either before the ending character of the first word, or after the first character of the second word, or by deleting the space, are used in the comparing step 252, because they correspond to more common typographical errors. The newly formed valid words that match the subject words are then identified as candidate replacement words for the subject words in step 254. For example, candidate replacement words for the word pair "use swords" would be "uses words" and candidate replacement words for the word pair "dog sand" would be "dogs and". Similarly, a candidate replacement word for the word pair "any one" would be "anyone", and, reversed, a candidate replacement word for the word pair "anyone" would be "any one".

At step 256 of the method, the candidate list 216 is formed that includes the subject words paired with their corresponding identified candidate replacement words. Finally, at step 258, the candidate table 216 is stored on a computer readable medium, such as that described above with respect to FIG. 1.

In accordance with another embodiment of the invention, the candidate score 224 is generated for each of the pairs of subject and candidate replacement words in step 256 based on a probability that the candidate replacement word should replace the corresponding subject word, as explained above. The candidate scores are preferably based upon one or more of the factors analyzed in the comparing step 252 and those discussed above. The candidate score is included in the candidate table 216 that is stored on the computer readable medium in step 258.

Candidate Exclusion Table

In accordance with another embodiment of the invention, a candidate exclusion table 260 is generated that identifies certain candidate replacement words that the candidate generator 208 should not submit to the contextual spelling engine 210 as candidate replacement words 222. Thus, the candidate exclusion table 260 prevents inappropriate or undesirable candidate replacement words from being suggested to the application 206 by the contextual spelling engine 210. Preferably, the candidate exclusion table 260 includes candidate replacement words that are offensive. Additionally, words that are difficult to disambiguate and often occur in similar contexts can be included in the candidate exclusion table, such as "rough" and "tough". Acceptable spelling variants of the same subject word, such as "color" and "colour", or "goodbye" and "good-bye", can be eliminated by including them in the candidate exclusion table 260. Also, since typographical errors that result in a plural form of a singular input word are rare, singular subject words and their plural counterparts are preferably included in the candidate exclusion table 260.

In accordance with one embodiment of the invention, the candidate table 216 is periodically updated to eliminate the subject word and candidate replacement word pairs having matching word pairs in the candidate exclusion table 260. Additionally, the subject word and candidate replacement word pairs in the candidate table 216 having candidate replacement words that match those in the candidate exclusion table 260 can also be eliminated. The resulting reduction to the size of the candidate table 216 allows the spell checking system 200 to operate more efficiently.

Although the present invention has been described with reference to particular embodiments, workers skilled in the art will recognize that changes may be made in form and detail without departing from the spirit and scope of the invention.

What is claimed is:

1. A method comprising:
   providing a computer comprising a processor;
   providing a tangible computer storage medium;
   executing instructions stored in the computer storage medium using the processor;
   receiving an input string comprising two or more input words;
   suggesting a replacement word for one of the input words responsive to executing the instructions comprising:
      obtaining candidate replacement words for one of the input words;
      obtaining a candidate score for each candidate replacement word, each candidate score indicative of a probability that the input word should be replaced with the corresponding candidate replacement word;
      generating a candidate replacement string for each candidate replacement word, each candidate replacement string comprising the candidate replacement word and the input words of the input string less the input word corresponding to the candidate replacement word;
      producing probability scores for each of the candidate replacement strings based on statistical data;
      calculating a final score for each of the candidate replacement words based on the candidate score for the candidate replacement word and the probability score for the candidate replacement string containing the candidate replacement word; and
      suggesting replacement of the input word with one of the corresponding candidate replacement words based on the final scores of the candidate replacement words.

2. The method of claim 1, wherein obtaining candidate replacement words for one of the input words comprises:
   matching the input word to subject words of a candidate table; and
   obtaining one or more candidate replacement words from the candidate table corresponding to the matched subject word.

3. The method of claim 2, wherein the probability scores are based on a likelihood of the words of the candidate replacement string appearing together.

4. The method of claim 2, wherein the subject words and the corresponding candidate replacement words of the candidate table are each in the form of a lexicon identifier that identifies the words in a lexicon.

5. The method of claim 2, wherein the candidate replacement words of the candidate table include words having an edit distance from their corresponding subject words that meets a threshold.

6. The method of claim 2, wherein the candidate replacement words of the candidate table include words that have a similar meaning to their corresponding subject words.

7. The method of claim 2, wherein the candidate replacement words of the candidate table include words that have a phonetic match to their corresponding subject words.

8. The method of claim 2, wherein the candidate replacement words of the candidate table include words that are common corrections to their corresponding subject words.

9. A system comprising:
   a computer including a processor;
   a tangible computer-readable medium;
   program modules comprising instructions executable by the processor to suggest replacement words for input words of an input string, the modules comprising:
      a candidate generator including an output of one or more candidate replacement words and corresponding candidate scores for one of the input words that match a subject word of a candidate table, wherein each candidate score is indicative of a probability that the input word should be replaced with the corresponding candidate replacement word;
      a contextual spelling engine receives the output of one or more candidate replacement words and produces a candidate replacement string for each candidate replacement word, each candidate replacement string comprising the candidate replacement word and the input words of the input string less the input word corresponding to the candidate replacement word; and
      a language model having an output of probability scores for each of the candidate replacement strings, the probability scores based on statistical data;
      wherein the contextual spelling engine calculates a final score for each of the candidate replacement words based on the candidate score for the candidate replacement word and the probability score for the candidate replacement string containing the candidate replacement word, and outputs one of the candidate replacement words based on the final scores.

10. The system of claim 9, including a candidate exclusion table including a list of candidate replacement words that are excluded from one of the output of the candidate generator and the output of the contextual spelling engine.

11. The system of claim 9, wherein the probability scores are based on a likelihood of the words of the candidate replacement string appearing together.

12. The system of claim 9, wherein the candidate replacement words of the candidate table include words having an edit distance from their corresponding subject words that meets a threshold.

13. The system of claim 9, wherein the candidate replacement words of the candidate table include words that have a similar meaning to their corresponding subject words.

14. The system of claim 9, wherein the candidate replacement words of the candidate table include words that have a phonetic match to their corresponding subject words.

15. The system of claim 9, wherein the candidate replacement words of the candidate table include words that are common corrections to their corresponding subject words.

16. A method comprising:
providing a computer comprising a processor;
providing a tangible computer storage medium;
executing instructions stored in the computer storage medium using the processor;
receiving an original input string of two or more input words, wherein at least one of the input words is misspelled;
suggesting a replacement word for one of the input words responsive to executing the instructions comprising:
correcting the misspelled input words of the original input string to thereby generate a corrected input string that contains only correctly spelled input words;
matching the input words of the corrected input string to subject words of a candidate table;
extracting candidate replacement words and corresponding candidate scores from the candidate table each corresponding to the matched subject words, wherein each candidate score is indicative of a probability that the input word of the corrected input string should be replaced with the corresponding candidate replacement word;
generating a candidate replacement string for each candidate replacement word, each candidate replacement string comprising the candidate replacement word and the input words of the corrected input string less the input word corresponding to the candidate replacement word;
producing probability scores for each of the candidate replacement strings based on statistical data;
calculating a final score for each of the candidate replacement words based on the candidate score for the candidate replacement word and the probability score for the candidate replacement string containing the candidate replacement word; and
selectively suggesting replacement of the input words of the corrected input string with their corresponding candidate replacement words based on the final scores for the candidate replacement words.

17. The method of claim 16, wherein the candidate replacement words of the candidate table include words having an edit distance from their corresponding subject words that meets a threshold.

18. The method of claim 16, wherein the candidate replacement words of the candidate table include words that have a similar meaning to their corresponding subject words.

19. The method of claim 16, wherein the candidate replacement words of the candidate table include words that have a phonetic match to their corresponding subject words.

20. The method of claim 16, wherein the candidate replacement words of the candidate table include words that are common corrections to their corresponding subject words.

21. The method of claim 16, wherein the probability scores are based on a likelihood of the words of the candidate replacement string appearing together.

* * * * *